United States Patent [19]

Faessinger et al.

[11] 3,860,547

[45] Jan. 14, 1975

[54] PRINTING FLUID

[75] Inventors: Robert W. Faessinger, Media; Guido G. Roccheggiani, Chester, both of Pa.

[73] Assignee: Scott Paper Company, Philadelphia, Pa.

[22] Filed: Sept. 27, 1967

[21] Appl. No.: 671,546

Related U.S. Application Data

[63] Continuation of Ser. No. 424,226, Jan. 8, 1965, abandoned.

[52] U.S. Cl............................ 260/29.4 R, 8/7, 8/82, 8/85, 117/15, 117/38, 117/155, 260/67.6 R, 260/39 P
[51] Int. Cl....................... C08g 51/24, C08g 51/66
[58] Field of Search......... 260/29.4, 69; 106/20, 22; 8/7, 18, 76, 82, 85; 162/126, 134, 162, 166, 167; 117/15, 38

[56] References Cited
UNITED STATES PATENTS

| | | | |
|---|---|---|---|
| 2,197,442 | 4/1940 | Widmer | 8/18 |
| 2,345,543 | 3/1944 | Wohnsiedler et al. | 260/29.4 |
| 2,485,079 | 10/1949 | Wohnsiedler et al. | 260/29.4 |
| 2,556,902 | 6/1951 | Chambers et al. | 260/29.4 |
| 2,730,446 | 1/1956 | Hutchins | 162/162 |
| 3,128,222 | 4/1964 | Herschler et al. | 162/162 |
| 3,275,605 | 9/1966 | Eastes et al. | 260/69 |

*Primary Examiner*—John C. Bleutge
*Attorney, Agent, or Firm*—Bacon & Thomas

[57] ABSTRACT

Aqueous, low-viscosity, printing fluids containing (A) A water-soluble, cationic, thermosetting resin prepared by reacting either (1) an aminotriazine and formaldehyde or (2) an aminotriazine with formaldehyde and an alkylene polyamine, urea or a mixture of alkylene polyamine and urea, and (B) a water-soluble dye which is compatible with the resin. These printing fluids are useful in high speed paper printing processes.

9 Claims, No Drawings

PRINTING FLUID

This application is a continuation of Ser. No. 424,226, filed Jan. 8, 1965, now abandoned.

This invention pertains to novel printing fluids; more particularly, this invention relates to certain aqueous printing fluids of certain mixtures of thermosetting resins and particular dyes suitable for printing unsized webs at printing velocities, for example, up to about 5,000 ft/min and over. The printed products obtained by printing with the novel printing fluids are within the purview of this invention.

In a majority of prior-art rotogravure processes pigmented printing fluids of high vapor pressure solvents have been used. These fluids contain dispersed particulate matter of great hiding power. Particles dispersed within these fluids give the tinctorial strength needed for printing when these fluids are deposited on the surface of the printed web and the solvent removed thereafter.

While the final print quality of these fluids is often excellent, the process possesses inherent limitations such as the velocity at which the web may be printed as well as the rate of solvent removal from the pigmented fluids. Needless to say, the many dangers inherent in using high vapor pressure solvents are considerable.

Other prior-art shortcomings, in comparison with this process, are the life span of the rotogravure roll or intaglio surface because the pigmented particulate materials abrade the roll surface in places of contact with another surface such as the printing nip, and doctor blades.

Still other shortcomings found in prior art rotogravure printing are the higher viscosities of printing fluids. The viscosity, coupled with the abrasive nature of the fluid, illustrates why rotogravure rolls are short-lived in comparison with this process.

Additionally, the high viscosity of the fluid prevents the printing process from running at high speeds. For example, at high speeds the tackiness of the prior-art fluids would cause fiber "picking" or removal from the web and at still higher viscosities cause the paper to wrap itself around the printing surface. This phenomenon is avoided by reducing the viscosity of the printing fluid by adding solvent.

Therefore, it is obvious that any change in one property of the fluid will significantly alter other properties of the fluid if the nature of the prior art system is significantly changed to obtain improved results.

It has now been found that a completely new and unobvious approach in printing fluids does overcome most of the prior-art shortcomings and allows the printing operations to be carried out at web velocities up to about 5,000 ft/min and higher or a web velocity of about a mile per minute at a cost substantially lower than achievable by any prior-art processes.

It has now been found that a completely new and unobvious approach in printing fluids does overcome most of the prior-art shortcomings and allows the printing operations to be carried out at web velocities up to about 5,000 ft./min. and higher or a web velocity of about a mile per minute.

The novel printing fluid suitable for rotogravure printing at web velocities up to about 5,000 ft./min. comprises an aqueous solution, a resin prepared by reacting (a) an aminotriazine such as melamine (b) formaldehyde, and if desired (c) either an alkylene polyamine or urea or a mixture thereof, a dye compatible with said resin, said dye and resin mixture having a stability of from about 1 hour to in excess of 4 months and a transference value of from about 0 to about 4, and a viscosity at 77°F of about 20 cps. Condensation products of (a) and (b) or (a), (b) and (c) are equally useful in this process, although the (a) and (b) product is preferred.

The resin described above may be prepared by reacting an aminotriazine such as melamine, ammeline, formoguanamine, acetoguanamine, propionoguanamine, 4N-methyl-2-acetoguanamines, 4N-ethyl-2-acetoguanamines, etc. Melamine-formaldehyde resin is the preferred species.

Alkylene polyamines useful in this process are those of the following formula

Y is selected from the group consisting of

where $m$ is an integer from 2 to 4 and $p$ is an integer from 1 to 4.

Ureas suitable for condensation with formaldehyde and the above components are such as urea, thiourea, methylolurea, ethylolurea, etc.

A more thorough discussion of these various resins is found in U.S. Pat. Nos. 2,345,543, 2,485,079 and 2,769,799. All of the above patent disclosures are incorporated in the present case to avoid undue length of the specification.

This printing fluid, as further amplified herein, is suitable for rotogravure intaglio printing of papers having an absorbency time of less than 600 sec./0.01 ml. of water. The more preferred papers have an absorbency rate as depicted in the following table.

TABLE

| Types of Paper | ABSORBENT PAPERS Most Preferred | More Preferred | Preferred |
|---|---|---|---|
| Multi-Ply Toilet/Facial Tissues | | | |
| Basis Weight lb/ream | 9.2 – 10.7 | 7.5 – 11.5 | 5.0 – 15.0 |
| Absorbency second/0.10 ml | 0 – 10 | 0 – 15 | 0 – 180 |
| Single Ply Toilet Tissue | | | |
| Basis Weight lb/ream | 11.5 – 14.0 | 9.0 – 16.0 | 7.0 – 20.0 |
| Absorbency sec/0.01 ml | 0 – 60 | 0 – 120 | 0 – 300 |
| Single Ply — Towel/Wiper | | | |
| Basis Weight — lb/ream | 20.0 – 36.0 | 11.0 – 40.0 | 10.0 – 50.0 |
| Absorbency — sec./0.10 ml | 0 – 60 | 0 – 360 | 0 – 600 |
| Multi Ply Towel/Wiper | | | |
| Basis Weight — lb/ream | 9.0 – 20.0 | 8.0 – 21.0 | 5.0 – 25.0 |
| Absorbency — sec/.01 ml | 0 – 60 | 0 – 300 | 0 – 600 |

TABLE -Continued

| Types of Paper | ABSORBENT PAPERS Most Preferred | More Preferred | Preferred |
| --- | --- | --- | --- |
| Single Ply Napkin | | | |
| Basis Weight — lb/ream | 12.0 - 15.5 | 9.0 - 19.0 | 6.0 - 25.0 |
| Absorbency — sec/0.01 ml | 0 - 100 | 0 - 360 | 0 - 600 |
| Multi Ply Napkin | | | |
| Basis Weight — lb/ream | 9.7 - 11.2 | 7.0 - 15.0 | 5.0 - 20.0 |
| Absorbency — sec/0.10 ml | 0 - 300 | 0 - 600 | 0 - 600 |

Basis weight is expressed in pounds per 24 × 36 inches × 480 sheet ream (2,880 square ft).

Absorbency is expressed in seconds as the time required for the paper specimen to absorb a specified volume of distilled water. The area of each specimen (obtained from a retail unit) is to be no less than 9 square inches, cut to 3 × 3 inches. The specimen to be tested will be suspended in a suitable frame to provide a flat, undistorted surface with no contact on either side of the specimen with any other surface or material. With the specimen thus prepared, the specific volume of water in a single drop will be lowered by appropriately divisioned pipette to the surface of the specimen. Timing begins as the water drop touches the specimen and ends with complete absorption – defined as the instant at which the water on the surface fails to reflect light.

| For single-ply tissue and/or napkins | 0.01 ml H$_2$O |
| --- | --- |
| For all others | 0.10 ml H$_2$O |

Samples from each case will be from no less than 10% of the retail package contained therein. Each individual test will be the result of three drops/side, reporting the 6 drop average as the individual test result. The average of these tests will represent the absorbency.

The test described above conducted under atmospheric conditions controlled to 75 ± 2°F and 60 ± 2% R.H.

In order to render the present resin acceptable for printing purposes the resin must be modified by acidic catalysts compatible with the dye-resin solutions. Examples of acid catalysts are such as acidic acid, lactic acid, glycolic acid, diglycolic acid, citric acid, phosphoric acid, hydrochloric acid, ammonium chloride, etc.

Further, to improve fluid stability, particularly at low resin-to-dye ratios, fluid additives are included; these are exemplified by compounds such as formaldehyde, methyl alcohol, glyoxal, glycols such as ethylene (low molecular-weight poly ethylene glycol) and propylene glycol, glycol ethers such as Cellosolve and Carbitol; formamide, dimethylformamide, polyvinyl pyrolidone, tetrahydrofurfuryl alcohol, dimethyl sulfoxide, and the like compounds such as with hydroxy containing moieties or highly polar unreactive compounds, etc.

Urea is also added to the present fluid for dye solubilizing and formaldehyde scavenging. If problems exist with fluid affinity for gravure rolls, which are generally chrome plated, surface-active agents may be added. Examples of these are nonionic surface-active agents such as nonylphenoxypoly (ethyleneoxy) ethanol and others obtainable from Atlas Chemical Corp. such as the Atmos Atmul, and Tween series of non-ionics.

The resin in solution must also exhibit non-dilatant viscosity characteristics. For purposes of this invention, the described condensates are also limited by the viscosity considerations as set out herein.

The water soluble dyes useful in the novel fluid are generally those with anionic characteristics, i.e., bearing an opposite charge to the resin. Although the combination of a cationic resin and an anionic dyestuff is basically incompatible, this difficulty can be overcome by using an amount of resin in excess of the stoichiometric ratio. For example most water soluble cationic thermosetting resins may be made compatible with direct, acid and reactive dyes.

This stabilized solution it is believed in turn coacts by curing on the fibers in the web and the degree of this reaction is measured by a transference value.

As there are an untold number of dyes and each dye, it has been found, reacts unpredictably vis-a-vis the particular resin, only a certain family of dyes will be operative in this process. However, since the concept of usisng a particular water soluble thermosetting resin with a particular dye is novel from the stability aspect as well as the transfer value aspect, many dyes are eliminated on the basis of the first ground as well as on the second. The tests designed to delineate the acceptable dyes from those failing in the instant fluids are set out below and fully discussed. Again, it is stressed that not all dyes meet the first two requirements and that predictability is impossible to establish beforehand. Moreover, in order for the dye to be acceptable, it must be used in quantities such as will establish an acceptable print. Again, this property relates to stability as the dye affects the fluid stability if the dye is present in considerable amounts. In other words, for each particular resin-dye combination a direct relationship exists between fluid stability and the ratio of resin nonvolatile solids (N.V.S.) to dye, i.e., stability is adversely affected as the resin to dye ratio decreases.

Fluid stability at room temperature (77°F) is herein defined as the period of time intercurring between the manufacture of a fluid and the appearance of physical-chemical changes that would adversely affect operability. These changes usually take place over a period of time and the limiting factors from the standpoint of fluid utilization are the following:

A ± 25% change in fluid viscosity from the original value and a departure from the initial one-phase solution.

Stability is measured on an arbitrary scale defined from most preferred fluids as A, signifying a stability of 1 month or more, for preferred fluids as B, signifying a stability of 1 week to a month, for useable fluids as C, the stability ranging from 1 hour to 1 week and for unacceptable fluids as O, the stability being 1 hour or less or complete incompatibility in fluid components.

Fluid stability as herein defined is also indicative of "shelf life" or "storage life". Storage life, as defined by the Packaging Institute in the *Glossary of Packaging Terms*, 2nd ed., Riverside Press, Essex, Conn., 1955 is "the period of time during which a packaged product can be stored under specific temperature conditions and remain suitable for use. Sometimes called shelf life."

Even if a proper amount of dye can be dissolved in the solution it may not be acceptable because of the bleeding in water "or transfer value test."

The novel printing fluids can also be cleaned which is hardly possible with the pigmented printing fluids since filtering or centrifugation would remove pigment tinctorial material. This property of fluid gives rise to a recirculating system as, in the case of loosely-bonded absorbent papers, the paper dust and loose fibers must be removed from the fluid in order not to overload the system with particulate materials. Therefore, the need for a low-viscosity aqueous solution is important as these solutions can be easily cleaned or separated from impurities such as by centrifugation. This viscosity criterion is of importance because the impurities are removed by cleaning means such as those based upon differences in specific gravity. Consequently, dust-laden webs as well as loosely-bonded webs can be printed by means of this fluid because they are cleanable.

Transference, as previously mentioned, relates to the ability of the printed area to resist water washing or bleeding after the resin has cured to the thermosetting state.

Transference solutions establishing the standard values for the different resin dye mixtures and classifying acceptable fluids are given below:

Transfer is herein defined as the amount of tinctorial material removed from the original colored area by the addition of distilled water and transferred to either an unprinted area of the same substrate or onto another substrate when physical contact is established.

Transfer rating scale:
0 - No noticeable transfer
1 - Very slight (barely noticeable) transfer
2 - Slight transfer
3 - Moderate transfer
4 - Heavy transfer
5 - Very heavy transfer The transfer rating scale is based on the intensity of the color removed when compared with the intensity of the original colored area.

Transfer rating is by definition O as a result of carrying out the following experiment: 2 g. of C.I. Direct Blue 1 dyestuff (DuPont Pontamine Sky Blue 6 BX) are dissolved in 50 ml of distilled water heated to 130°F and transferred into 50 g. of polyhydroxypolyalkylenepolyurea-formaldehyde condensate (30% N.V.S.), U.S. Pat. No. 2,699,435 (Example 2, appropriately adjusted for its N.V.S. content) Uformite 700 (Rohm & Haas) with agitation. Subsequently, 3 g. of NH$_4$Cl are added to the dye-resin solution and mixing is continued until the catalyst is completely dissolved. Using a 100 microliter pipette, three-hundredths of one ml (.03 ml) of fluid is placed on a No. 1 Whatman filter paper and dried (cured) for one hour in an oven at 230°F. The colored portion of the filter paper is then immersed for five seconds in distilled water, the excess water is removed by contacting any absorbent medium, and finally the damp test sample is sandwiched between two two-layer pads of No. 1 Whatman filter paper. A two-pound weight is placed on the top of the filter pad and remains there for at least ten hours, after which time the sample is removed and the two filter surfaces in contact with the test sample upon examination exhibit no noticeable transfer.

Transfer rating is by definition 1 as a result of carrying out the following experiment. 2 g. of C.I. Direct Blue 1 dyestuff (DuPont Pontamine Sky Blue 6 BX) are dissolved in 50 ml of distilled water heated to 130°F and transferred into 50 gr. of polyhydroxypolyalkylenepolyurea-formaldehyde condensate (30% N.V.S.), U.S. Patent No. 2,699,435, Uformite 700 (Rohm & Haas) with agitation. Subsequently, 3 g. of NH$_4$Cl are added to the dye-resin solution and mixing is continued until the catalyst is completely dissolved. Using a 100 microliter pipette, 0.03 ml of fluid is placed on a No. 1 Whatman filter paper and dried (cured) for 10 minutes in an oven at 230°F. The colored portion of the filter paper is then immersed for 5 seconds in distilled water, the excess water is removed by contacting any absorbent medium, and finally the damp test sample is sandwiched between two two-layer pads of No. 1 Whatman filter paper. A 2 pound weight is placed on the top of the filter pad and remains there for at least 10 hours after which time the sample is removed and the two filter surfaces in contact with the test sample upon examination exhibit a very slight (barely noticeable) transfer.

Transfer rating is by definition 2 as a result of carrying out the following experiment: 2 g. of C.I. Direct Blue 1 dyestuff (DuPont Pontamine Sky Blue 6 BX) are dissolved in 50 ml of distilled water heated to 130°F and transferred into 50 g. of polyhydroxypolyalkylenepolyurea-formaldehyde condensate (30% N.V.S.) U.S. Pat. No. 2,699,435, Uformite 700 (Rohm & Haas) with agitation. Subsequently, 0.5 g. of NH$_4$Cl is added to the dye-resin solution and mixing is continued until the catalyst is completely dissolved. Using a 100 microliter pipette, (0.03 ml) of fluid is placed on a No. 1 Whatman filter paper and dried (cured) for 60 minutes in an oven at 230°F. The colored portion of the filter paper is then immersed for five seconds in distilled water, the excess water is removed by contacting any absorbent medium, and finally the damp test sample is sandwiched between two two-layer pads of No. 1 Whatman filter paper. A 2 pound weight is placed on the top of the filter pad and remains there for at least 10 hours, after which time the sample is removed and the two filter surfaces in contact with the test sample upon examination exhibit a slight transfer.

Transfer rating is by definition 3 as a result of carrying out the following experiment: 2 g. of C.I. Direct Blue 1 dyestuff (DuPont Pontamine Sky Blue 6 BX) are dissolved in 50 ml of distilled water heated to 130°F and transferred into 50 g. of polyhydroxypolyalkylenepolyurea-formaldehyde condensate (30% N.V.S.), U.S. Pat. No. 2,699,435, Uformite 700 (Rohm & Haas) with agitation. Subsequently, 0.5 g. of NH$_4$Cl is added to the dye-resin solution and mixing is continued until the catalyst is completely dissolved. Using a 100 microliter pipette, three hundredths of one ml (.03 ml) of fluid is placed on a No. 1 Whatman filter paper and dried (cured) for 30 minutes in an oven at 230°F. The colored portion of the filter paper is then immersed for five seconds in distilled water, the excess water is removed by contacting any absorbent medium, and finally the damp test sample is sandwiched between two two-layer pads of No. 1 Whatman filter paper. A 2 pound weight is placed on top of the filter pad and remains there for at least 10 hours, after which time the sample is removed and the two filter surfaces in contact with the test sample upon examination exhibit a moderate transfer.

Transfer rating is by definition 4 as a result of carrying out the following experiment: 2 g. of C.I. Direct Blue 1 dyestuff (DuPont Pontamine Sky Blue 6 BX) are dissolved in 50 ml of distilled water heated to 130°F and transferred into 50 g. of polyhydroxypolyalkylenepolyurea-formaldehyde condensate (30% N.V.S.), U.S. Pat. No. 2,699,435, Uformite 700 (Rohm & Haas) with agitation. Subsequently, 0.5 g. NH$_4$Cl is added to the dye-resin solution and mixing is continued until the catalyst is completely dissolved. Using a 100 microliter pipette, 0.03 ml of fluid is placed on a No. 1 Whatman filter paper and dried (cured) for 15 minutes in an oven at 230°F. The colored portion of the filter paper is then immersed for 5 seconds in distilled water, the excess water is removed by contacting any absorbent medium, and finally the damp test sample is sandwiched between two two-layer pads of No. 1 Whatman filter paper. A 2 pound weight is placed on the top of the filter pad and remains there for at least 10 hours, after which time the sample is removed and the two filter surfaces in contact with the test sample upon examination exhibit a heavy transfer.

Transfer rating is by definition 5 as a result of carrying out the following experiment: 2 g. of C.I. Direct Blue 1 dyestuff (DuPont Pontamine Sky Blue 6 BX) are dissolved in 50 ml of distilled water heated to 13°F and transferred into 50 g. of polyhydroxypolyalkylenepolyurea-formaldehyde condensate (30% N.V.S.), U.S. Pat. No. 2,699,435 Uformite 700 (Rohm & Haas) with agitation. Subsequently, the dye-resin solution pH is adjusted to 10 by addition of 20 drops of saturated NaOH solution and mixed until the catalyst is completely dissolved. Using a 100 microliter pipette, three-hundredths of 1 ml (.03 ml) of fluid is placed on a No. 1 Whatman filter paper and sample remains uncured (not oven dried). The colored portion of the filter paper is then immersed for 5 seconds in distilled water, the excess water is removed by contacting any absorbent medium, and finally the damp test sample is sandwiched between two two-layer pads of No. 1 Whatman filter paper. A 2 pound weight is placed on the top of the filter pad and remains there for at least 10 hours, after which time the sample is removed and the two filter surfaces in contact with the test sample upon examination exhibit a very heavy transfer.

For the process to be operative at the high-web velocities such as above 5,000 ft./min. the viscosity of the fluid must be kept within certain limits. At lower web velocities the viscosity may be higher such as about 20 cps, but again, a more viscous fluid picks up more fiber and may be harder to clean and for this reason is not desirable. For purposes of this process viscosities below 15 cps are preferred. The preferred range of viscosity for the fluid is of from about 3 cps to 10 cps while the most preferred range is about 3 cps to about 7 cps at 77°F.

In the instant case procedure for determination of liquid viscosities by the Cannon-Fenske Routine Viscometer was used. Equipment needed for viscosity determination includes a constant temperature bath, a timer and the proper size Cannon-Fenske Routine Viscometer tube. Size 50 tube is recommended for a range of 0.8 to 3.2 centistokes, size 100 tube for 3 to 12 centistokes, size 150 tube for 7 to 28 centistokes and size 200 tube for 20 to 80 centistokes.

The bath temperature is maintained at 25.0°C ± 0.1°C. The viscosity in centipoises is then calculated by multiplying the centistoke viscosity by the liquid density at 25°C. The liquid density at 25°C is calculated by the following equation: Density of liquid at 25°C = (sp.g. at t°F) (dens. water at 60°F)

$$\frac{\text{Dens. water at } 25°\text{C.}}{\text{dens. water at } t°\text{F.}} = (.00610) \frac{(\text{sp. g. @ } t°\text{F.})}{(\text{dens. water at } t°\text{F.})}$$

The above procedure as employed herein is discussed by M. R. Cannon in Ind. Eng. Chem., Anal., Ed., 10, 297 (1938).

In another aspect the present fluid differs from those of prior art, namely, surface tension. While most of the prior art fluids are designed with low surface tension characteristics to allow the wetting of the roll by the viscous fluid, presently defined fluids are operable at high-surface tension values because low viscosity fluid wets the intaglio surface at acceptable rates. Depending on the degree of surface wetting the surface tension may be varied by adding minor amounts of wetting agents to give the best results. The preferred values are below 50 dynes/cm and below the surface value of pure water (72 dynes/cm). An acceptable range is of from about 30 dynes/cm to about 60 dynes/cm. The surface tension is measured by means of Cenco-duNouy tensiometer.

In comparing the print obtained by means of the prior art pigmented rotogravure inks with the print obtained by the novel fluid the following differences exist. The prior art inks are opaque, i.e., they have considerable hiding power (impervious to the rays of light). On the other hand, the present dyes are transparent although these may be colored. The color value adjustment in prior art is obtained by adding white pigment and coloring. In the present fluids it is performed by preparing a different fluid with a different dye concentration. In practicing this invention, the white pigment is not needed and its place is taken by the color of the substrate, i.e., the color of fibers which are for the most part white for bleached pulp. Consequently a component previously required in a rotogravure ink is now eliminated. Of course, the printing of colored base sheets necessitates the use of colors that, upon becoming deposited on the base sheets, will give the needed color, e.g, a blue base sheet must be printed with yellow dye-resin solution to obtain green color.

Besides the above factors which contribute to the acceptance of the present fluids, the cost factor is an equally important consideration herein. For example, the cost as well as the necessity of grinding of pigment is eliminated because no pigment is used in this process. Reproducibility of color is extremely good because of standardized dyes and standardized colors. Uniformity of fluid concentration is easily maintained even during very long runs as no large amounts of volatile solvents are used which require constant adjustment. Needless to say, these advantages render the present fluid much less costly and especially suitable for modern mass production methods.

The following examples will serve further to illustrate the invention:

EXAMPLE 1

1 part by weight of a direct dye C. I. Direct Red 24, Pontamine Fast Scarlet 4BA, DuPont, was dissolved in 100 parts by weight of 37% formaldehyde solution, with agitation and heating to 130°F. The resulting solution was added slowly with agitation to 100 parts by weight of Paramel HE resin, obtained from American Cyanamid Company, an aqueous, cationic, melamine-formaldehyde resin solution of the type described in U.S. Pat. No. 2,345,543 or modified melamine-formaldehyde resin solutions of the type illustrated in U.S. Pat. Nos. 2,769,799, 2,485,079 or the like, having a non-volatile solids content of approximately 12%. The resulting solution was agitated for 15 minutes.

The fluid had the following properties: pH - 1.0, stability - 3 weeks.

The fluid was applied by a hand operated simulated rotogravure method on soft, absorbent two-ply dry crepe paper: i.e., facial tissue. The red imprinted area had a transfer rating of 0 after 4 weeks of aging at room temperature (77°F. ± 10°).

EXAMPLE 2

1 part by weight of a direct dye C.I. Direct Red 23, Pontamine Fast Scarlet 4BS, DuPont, was dissolved in 100 parts by weight of 37% formaldehyde solution, with agitation and heating to 130°F. The resulting solution was added slowly with agitation to 100 parts by weight of Paramel HE resin, obtained from American Cyanamid Company, having a non-volatile solids content of approximately 12%. The resulting solution was agitated for 15 minutes.

The fluid had the following properties: pH - 1.0, stability - 4 weeks.

The fluid was applied by a hand operated simulated rotogravure method on soft, absorbent two-ply dry crepe paper: i.e., facial tissue. The red imprinted area had a transfer rating of 0 after 4 weeks of aging at room temperature (77°F. ± 10°).

EXAMPLE 3

1 part by weight of a direct dye C.I. Direct Red 81, Pontamine Fast Red 8BLX, DuPont, was dissolved in 100 parts by weight of 37% $CH_2O$ solution, with agitation and heating to 130°F. The resulting solution was added slowly with agitation to 100 parts by weight of Paramel HE resin, having a non-volatile solids content of approximately 12%. The resulting solution was agitated for 15 minutes.

The fluid had the following properties: pH - 2.0, stability 8 weeks.

The fluid was applied by a hand operated simulated rotogravure method on soft, absorbent two-ply dry crepe paper: i.e., facial tissue. The red imprinted area had a transfer rating of 0 after 4 weeks of aging at room temperature (77°F. ± 10°).

EXAMPLE 4

1 part by weight of a direct dye C.I, Direct Violet 47, Pontamine Fast Violet 4RL, DuPont, was dissolved in 100 parts by weight of 37% $CH_2O$ solution, with agitation and heating to 130°F. The resulting solution was added slowly with agitation to 100 parts by weight of Paramel HE resin, having a non-volatile solids content of approximately 12%. The resulting solution was agitated for 15 minutes.

The fluid had the following properties: pH - 1.7, stability - 2 months.

The fluid was applied by a hand operated simulated rotogravure method on soft, absorbent two-ply dry crepe paper: i.e., facial tissue. The violet imprinted area had a transfer rating of 1 aftr 4 weeks of aging at room temperature (77°F. ± 10°).

EXAMPLE 5

1 part by weight of an acid dye, C.I. Acid Green 3, Acid Green 2G Conc., Sandoz, was dissolved in 100 parts by weight of 37% $CH_2O$ solution, with agitation and heating to 130°F. The resulting solution was added slowly with agitation to 100 parts by weight of Paramel HE, having a non-volatile solids content of approximately 12%. The resulting solution was agitated for 15 minutes.

The fluid had the following properties: pH - 1.7, stability - 57 days.

The fluid was applied by a hand operated simulated rotogravure method on soft, absorbent two-ply dry crepe paper: i.e., facial tissue. The green imprinted area had a transfer rating of 1 after 4 weeks of aging at room temperature (77°F. ± 10°).

EXAMPLE 6

1 part by weight of an acid dye C.I. Acid Yellow 3, Quinoline Yellow, DuPont, was dissolved in 100 parts by weight of 37% $CH_2O$ solution, with agitation and heating to 130°F. The resulting solution was added slowly with agitation to 100 parts by weight of Paramel HE resin, having a non-volatile solids content of approximately 21%. The resulting solution was agitated for 15 minutes.

The fluid had the following properties: pH - 1.0, stability - 3 weeks.

The fluid was applied by a hand operated simulated rotogravure method on soft, absorbent two-ply dry crepe paper: i.e., facial tissue. The yellow imprinted area had a transfer rating of 0 after 4 weeks of aging at room temperature (77°F. ± 10°).

EXAMPLE 7

1 part by weight of an acid dye C.I. Acid Violet 9, Pontacyl Fast Violet VR, DuPont, was dissolved in 100 parts by weight of 37% $CH_2O$ solution, with agitation and heating to 130°F. The resulting solution was added slowly with agitation to 100 parts by weight of Paramel HE resin, having a non-volatile solids content of approximately 21%. The resulting solution was agitated for 15 minutes.

The fluid had the following properties: pH - 1.0, stability - 3 weeks.

The fluid was applied by a hand operated simulated rotogravure method on soft, absorbent two-ply dry crepe paper: i.e., facial tissue. The violet imprinted area had a transfer rating of 0 after 4 weeks of aging at room temperature (77° ± 10°).

EXAMPLE 8

1 part by weight of an acid dye C.I. Acid Red 52, Kiton Rhodamine B, Ciba, was dissolved in 100 parts by weight of 37% $CH_2O$ solution, with agitation and heating to 130°F. The resulting solution was added slowly with agitation to 100 parts by weight of Paramel HE resin, having a non-volatile solids content of approximately 12%. The resulting solution was agitated for 15 minutes.

The fluid had the following properties: pH - 1.1, stability - 3 weeks.

The fluid was applied by a hand operated simulated rotogravure method on soft, absorbent two-ply dry crepe paper: i.e., facial tissue. The red imprinted area had a transfer rating of 3 after 4 weeks of aging at room temperature (77°F. ± 10°).

What is claimed is:

1. A low-viscosity printing fluid for printing cellulose webs which comprises an aqueous solution of (1) a water-soluble, cationic resin prepared by reacting (a) an aminotriazine and (b) formaldehyde and (2) a water-soluble dye compatible with said resin, said dye and resin mixture having a stability of from about 1 hour to in excess of 4 months, a transference value of from about 0 to about 4, and a viscosity of less than 20 cps. at 77°F.

2. A low-viscosity printing fluid for printing cellulose webs which comprises an aqueous solution of (1) a water-soluble, cationic resin prepared by reacting (a) an aminotriazine, (b) formaldehyde and (c) a compound selected from the class consisting of alkylene polyamines and ureas, and (2) a water-soluble dye compatible with said resin, said dye and resin mixture having a stability of from about 1 hour to in excess of 4 months, a transference value of from about 0 to about 4, and a viscosity of less than 20 cps. at 77°F.

3. A low-viscosity printing fluid as claimed in claim 2 wherein the water-soluble, cationic resin is prepared by reacting melamine with formaldehyde and an alkylene polyamine.

4. A low-viscosity printing fluid as claimed in claim 2 wherein the water-soluble, cationic resin is prepared by reacting melamine with formaldehyde and a urea.

5. A low-viscosity printing fluid as claimed in claim 2 wherein said fluid is free of particulate matter, has a viscosity of less than 15 cps. at 77°F., and has a transference value of from about 0 to about 3 as measured against standardized solutions of a standard thermosetting resin and a standard dye.

6. A low-viscosity printing fluid as claimed in claim 5 wherein the water-soluble, cationic resin is prepared by reacting at least one aminotriazine with formaldehyde and at least one alkylene polyamine having the formula:

wherein Y is selected from the group consisting of H and $C_mH_{2m}NH_2$, $m$ is an integer of from 2 to 4, and $p$ is an integer of from 1 to 4.

7. A low-viscosity printing fluid as claimed in claim 6 wherein said fluid has a viscosity of from about 3.0 cps. to about 7.0 cps., a surface tension of from about 30 to about 60 dynes per centimeter, and a transference value of from about 0 to about 2 as measured against standardized solutions of apolyhydroxypolyalkylene-polyurea-formaldehyde thermosetting resin condensate and a C.I. Direct Blue 1 dye.

8. A fibrous cellulose web product having a permanent print thereon which is derived from a fluid as claimed in claim 1.

9. A fibrous cellulose web product having a permanent print thereon which is derived from a fluid as claimed in claim 2.

* * * * *